Oct. 7, 1941.                J. A. HEIDBRINK                 2,258,054
                           HIGH ALTITUDE CHAMBER
                           Filed March 14, 1938           2 Sheets-Sheet 2
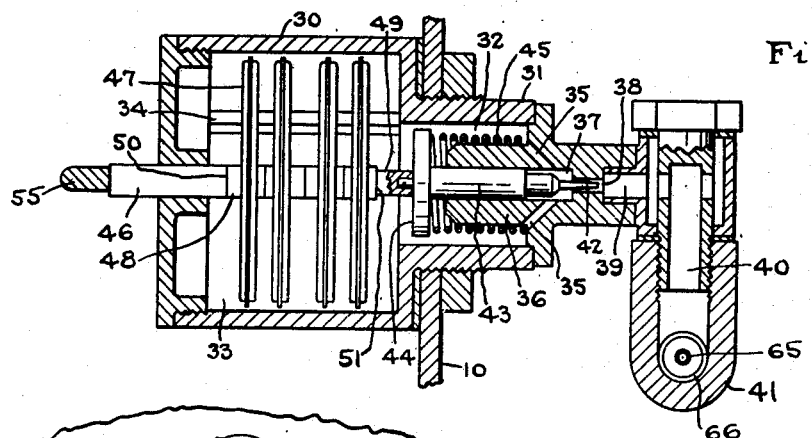
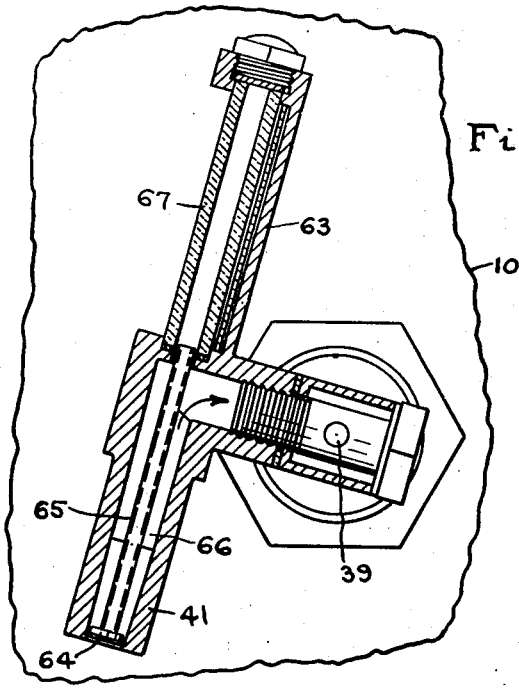
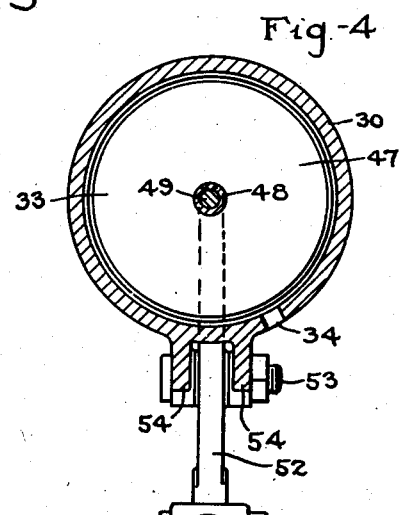
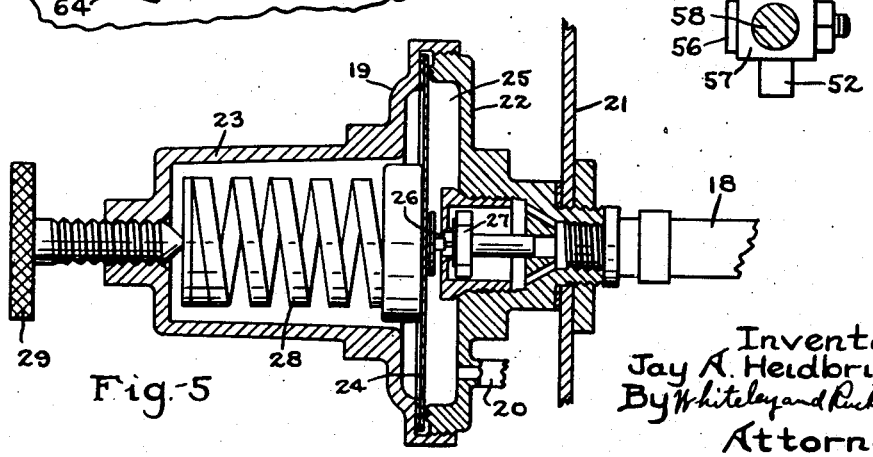
Inventor:
Jay A. Heidbrink.
By Whiteley and Ruckman
Attorneys.

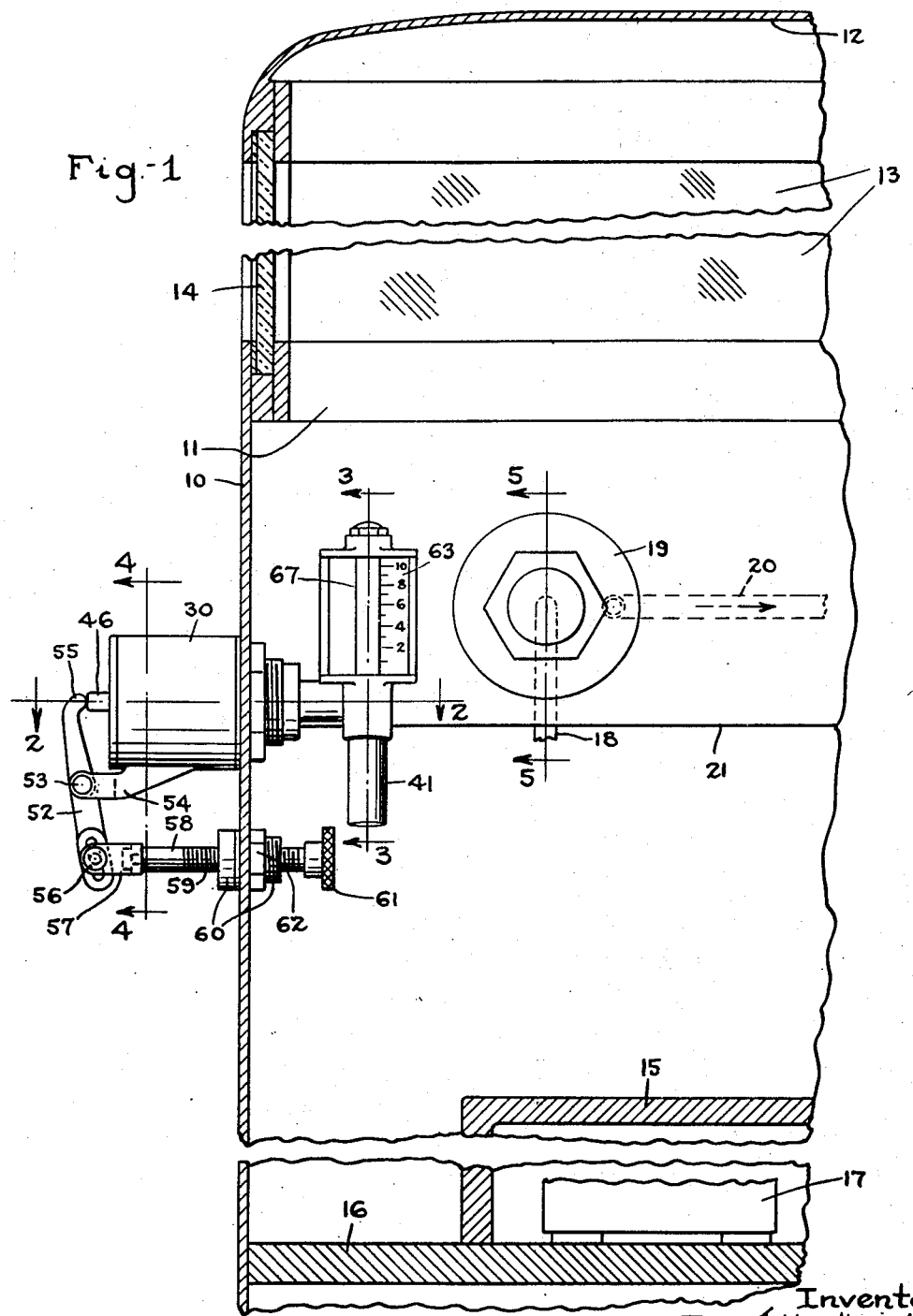

Patented Oct. 7, 1941

2,258,054

UNITED STATES PATENT OFFICE 2,258,054

HIGH ALTITUDE CHAMBER

Jay A. Heidbrink, Minneapolis, Minn., assignor, by mesne assignments, to Air Reduction Company, Incorporated, a corporation of New York Application March 14, 1938, Serial No. 195,790

1 Claim. (Cl. 128—204)

My invention relates to a method and means for conditioning air in closed chambers at high altitudes, and has for its primary object an association of devices for maintaining the pressure of air in a closed compartment, as, for example, the interior of an airplane compartment, at a uniform and livable pressure regardless of the altitude into which the closed compartment may be brought.

It is well-known that the pressure of the atmosphere progressively decreases from sea level to higher and higher altitudes. Most people live in altitudes near sea level to a maximum of a few thousand feet. In passing from the altitude to which persons are accustomed to higher altitudes, discomfort will be first experienced, then as the altitude gets still higher serious functional disturbances due to change of external pressure relative to the pressure of the adsorbed gases in the tissues and blood and to a depleted oxygen supply from the attenuated atmosphere which goes with reduced atmospheric pressure. In the art of aviation it is recognized that flying at higher altitudes than is practicable under conditions which have existed, even into the lower regions of the stratosphere, would very greatly facilitate not only the mere mechanical aspect of flying as to speed and power consumption, but the elimination of accidents due to collision with elevated portions of the land such as high plateaus and mountains. Yet, going into these high altitudes except for scientific purposes with costly special equipment has heretofore been impractical because of the effect of low air pressure and thin air upon the airship occupants.

It is the object of my invention to provide a passenger compartment for an airplane or other flying machine which shall be sealed airtight and which shall be so constructed and reenforced as to be able to resist the forces exerted by widely different gas pressures inside and outside of the compartment; and in combination with such a sealed compartment to provide means for compressing air within the compartment, with means for continuously permitting exhaust of said compressed air from within the compartment to provide suitable ventilation and withdrawal of noxious products of respiration, together with means outside of the compartment and subject to the pressure of the atmosphere at any elevation to which the flying machine may ascend which shall control the discharge of air from the sealed compartment into the reduced pressure atmosphere at varying elevations so that the air pressure within the compartment will be kept uniform at said differing elevations and be kept at a degree of pressure substantially that of comfortable living conditions in the atmosphere, say, not to exceed the pressure of the atmosphere at an elevation of three thousand feet.

Specifically my invention comprises an air compressor unit of standard construction with means for delivering air from said unit or from any desired means to the compartment at such point or points as may be desired, whereby a pressure within the compartment will be built up, means for permitting escape of air from the compartment and means controlled by the pressure of air outside of the compartment for varying the opening through which air is permitted to escape somewhat in proportion to the variation of pressure to which the compartment is subject. That is, to decrease the escape opening as the pressure of the atmosphere outside the compartment decreases in such manner that the outflow of air will be substantially constant throughout any range of pressures encountered, and the pressure within the compartment will thus be caused to remain substantially constant with the same ventilating change of air.

It is a further object of my invention to provide conveniently located, with respect to the pilot or operator, suitable gauges, particularly for showing the pressure of air within the sealed compartment, and, if, desired, for showing the pressure of the air without the compartment.

It is also an object of my invention to provide suitable reducing valve mechanism between the air-pump or air supply and the admission of the compressed air into the interior of the sealed chamber to effect delivery of air in relation to exhaust of air in such proportions as to maintain a constant desired pressure within the chamber, in connection with means under the control of the operator for adjusting from time to time such pressure reducer and the pressurestat exterior to the sealed compartment to bring about the most satisfactory and efficient carrying forward of the steps of my process.

The full objects and advantages of my invention will appear in connection with the detailed description thereof, and its novel features are particularly pointed out in the claim.

In the drawings, illustrating an application of my invention in one form,

Fig. 1 is a sectional transverse view of part of a sealed compartment such as the passenger and pilot compartment of an airplane or other flying machine, broken in part to show the relation of the cooperating devices to produce the results desired. Fig. 2 is a sectional plan view on line 2—2 of Fig. 1. Fig. 3 is a sectional elevation view taken on line 3—3 of Fig. 1. Fig. 4 is a sectional elevation view taken on line 4—4 of Fig. 1. Fig. 5 is a sectional view of the pressure reducer taken on line 5—5 of Fig. 1.

As illustrated, the side wall 10 of the plane cabin or other compartment, front wall 11, top wall 12 and other walls of the cabin form a sealed compartment. A front window 13 and side windows 14 are provided to give proper visibility to the pilot, who will have his seat on a bench 15 resting on the bottom floor 16 of the cabin. Suitably positioned and having an opening to outside atmosphere, not shown, is an air compressor diagrammatically indicated at 17, which moves air through a suitable conduit 18 to a pressure reducer delivery valve 19, from which valve a pipe 20 back of instrument board 21 leads to any suitable point or points of discharge to the interior of the cabin.

The pressure reducer 19 is of a well-known construction and is shown in detail in Fig. 5. It comprises a base casting 22 to which is secured a top casting 23 positioning a diaphragm 24 over a chamber 25 to which air may be delivered through delivery aperture 26. Valve member 27 is normally held open by a powerful spring 28, the tension of which is controlled by a hand nut 29. When air under pressure is delivered to chamber 25 the force of its pressure when the same or greater than the pressure of the air within the chamber, operating upon the diaphragm 24 may overcome the force of spring 28 and move the valve member 27 into closing position, as shown in Fig. 5. When, however, the pressure within the sealed chamber of the cabin falls, the pressure within chamber 25, in communication therewith through pipe 20, will correspondingly fall, permitting spring 28 to move the valve 27 into open position so that air under pressure will flow out into the sealed chamber. The tension of spring 28 controlled by hand nut 29 will thus by action of the operator regulate the pressure of the air within the sealed chamber of the cabin. It follows that when air is permitted to escape from the sealed chamber tending to reduce pressure within the chamber the feed-in of air from valve chamber 25 through discharge pipe 20 under pressure will make partial compensation for the withdrawal of air and maintaining the pressure within the chamber constant regardless of the volume of air discharged therefrom, it being understood that the air openings shown will be sufficiently large to provide for delivery of any required volume of air under pressure.

It is, of course, necessary at all times, in order that the air in the cabin shall be suitable for breathing, to permit discharge of air from the sealed cabin at a rate sufficient to prevent excessive accumulation of carbon dioxide or other products of respiration within the sealed cabin. This is accomplished by an aneroid arrangement as follows: A casing 30 has a reduced portion 31 extending through the side wall 10 of the sealed cabin and hermetically sealed into said side wall. Within the portion 31 is a chamber 32 communicating with chamber 33 on the inside of casing portion 30. And casing 30 has formed in its side wall a slot 34 which leads from chamber 33 to atmosphere outside of the sealed chamber of the cabin. The chamber 32 communicates by passageways 35 through the base of an extension 36 with a chamber 37, which, in turn, communicates through a valve bore passageway or chamber 38 with passageways 39 and 40, the latter of which opens through a pipe 41 to the inside of the sealed chamber of the cabin. Within passageway or chamber 38 is a conical valve member 42 which extends through chamber 37 and is connected with a sliding member 43 having on one end a head 44, and a spring 45 engaging said head tends to move the conical valve piece 42 outwardly so as to increase the average flow area of opening between chambers 37 and 38.

Within casing 30 is a pusher slide 46 engaging the first of a series of hollow chambered aneroid discs 47, said discs having hubs 48 slidable on a central rod 49. The aneroid discs 47 are filled with fluid at a normal pressure such that at atmospheric pressure at or near sea level the sides of the discs will be in substantially parallel planes. When the external pressure on the discs is reduced, the fluid within the discs will expand and the resultant force of their total expansion will cause a thrust between shoulder 50 on rod 46 and shoulder 51 formed on the end of rod 49 slidable relative to rod 46 which will be transmitted by rod 49 to the head 44 and move the slidable rod 43 against the force exerted by spring 45 to move the conical valve member 42 to reduce the size of air outflow channel 38. This reduction of size will be directly related to reduction of external pressure of the atmosphere, which in turn, by reducing the area of outflow of air as the velocity of that outflow increases because of reduced external pressure, will operate to maintain a discharge of a substantially constant volume of air from within the sealed chamber of the cabin at different and varying external pressures of the atmosphere. It may be desirable to regulate this arrangement manually from within the cabin. To accomplish this a lever 52 is pivoted at 53 to an arm 54 fast on casing 30. The lever 52 it provided with a toe 55 engaging the end of the sliding rod 46. By means of a pin and slot connection, indicated at 56, a block 57 connects for turning movements therein a rod 58 which is threaded at 59 into an externally threaded disc 60 fast on wall 10 and extends to the interior of the sealed compartment of the cabin, where it is provided with a hand nut 61 by which it can be turned by the operator to put more or less pressure on member 46 by means of toe 55 and transmitted through hubs 48 and rod end 49 to head 44 and spring 45. A stuffing-box arrangement 62 makes an air-tight connection of this member with wall 10.

The volume of flow of air from the interior is indicated to the operator upon a gauge 63 forming part of a flow meter of known construction. This comprises a piston member 64 on a rod 65 extending through a chamber 66 in the member 41, which chamber 66 may be more or less conical, as desired. Air discharging to the outside of the sealed compartment must pass through passageway 66, and in doing so will lift the piston 64 and rod 65 more or less according to the volume of air which is being discharged. The end of the rod 65 seen through glass tube 67 of gauge 63 will indicate on the calibrations of the gauge the units of air being discharged at any particular time.

The advantages of my invention will be apparent from the foregoing description. The influx of fresh air will, under the action of the device for bringing the air into the sealed compartment under compression, build up a pressure within the sealed compartment which my means of regulator 19 and discharge member 30, 34 will be sufficient, in view of such discharge, to maintain the atmosphere at a desired predetermined pressure under the control of the pilot or operator. This pressure will remain substantially constant at different and varying altitudes. It is also possible for the operator by the means described to maintain the desired pressure for predetermined discharge of volume of air as shown by the volume-control gauge. With this simple method and means, it is possible, therefore, for the operator not only to maintain a desired pressure suitable to conserve the comfort of pilot and passengers within an airship at high altitudes, but while maintaining such pressure to regulate the absolute volume of air at such pressure which shall enter and leave the sealed compartment of the cabin, whereby the air breathed by the passengers and pilot will be changed so as to constantly provide air of suitable oxygen content and suitably freed from the noxious products of respiration.

I claim:

In combination with a sealed compartment and means for moving it to different and varying elevations, means for moving outside air into the sealed compartment under pressure, means acted upon by the inlet air and by the pressure within the compartment to maintain the air within the compartment at a fixed pressure, an air outlet passageway leading from the compartment, a valve for controlling the opening through said passageway, an aneroid subject to air pressure outside the compartment for regulating said valve opening, manually operative means acting through said aneroid for additionally regulating said outlet opening, and a flow valve in said passageway for indicating the flow volume of air so controlled escaping from the compartment.

JAY A. HEIDBRINK.